March 2, 1971 D. A. WOLF 3,567,250

BICYCLE WITH IMPROVED BRAKE SYSTEM

Filed March 12, 1969 2 Sheets-Sheet 1

INVENTOR
DONALD A. WOLF

BY
Marechal, Biebel, French & Bugg
ATTORNEYS

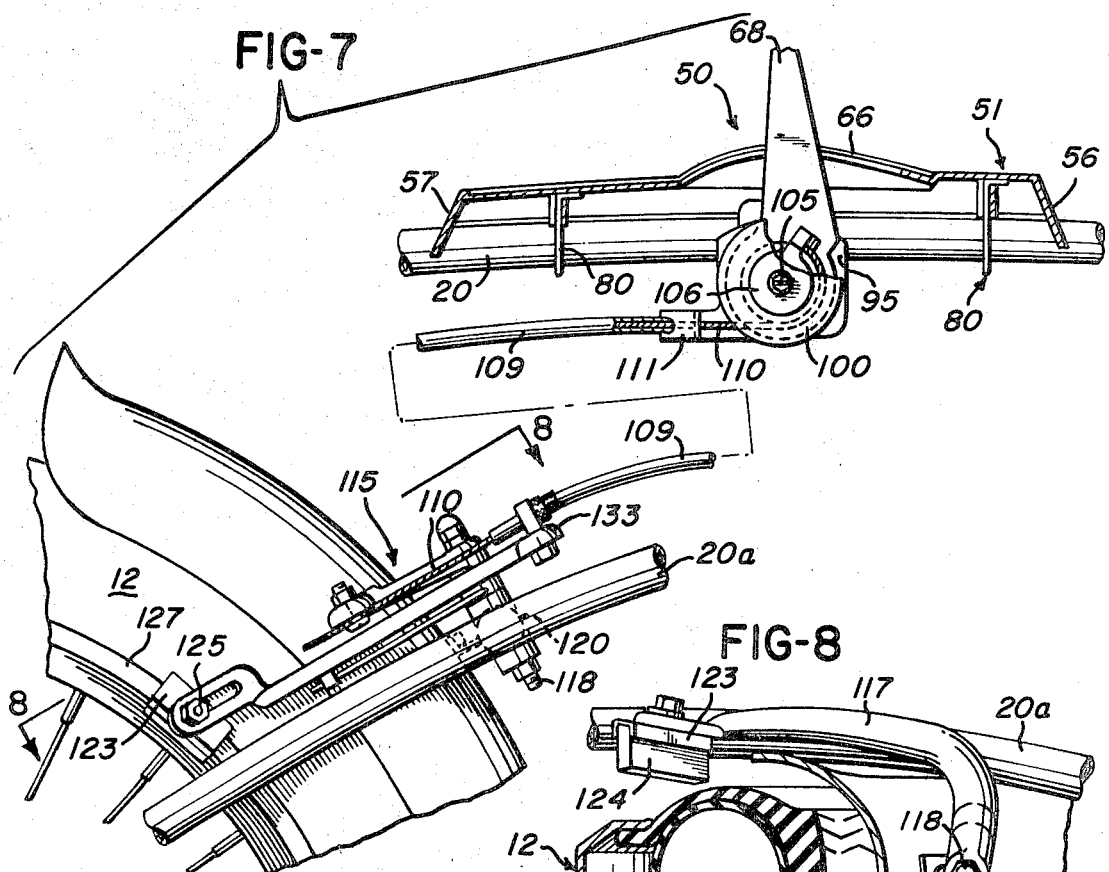
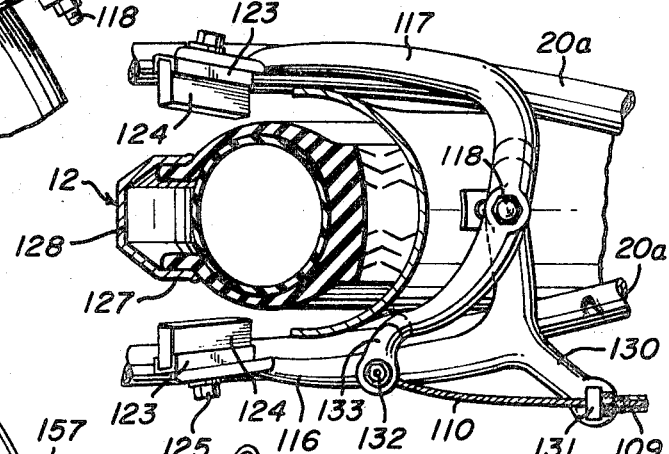
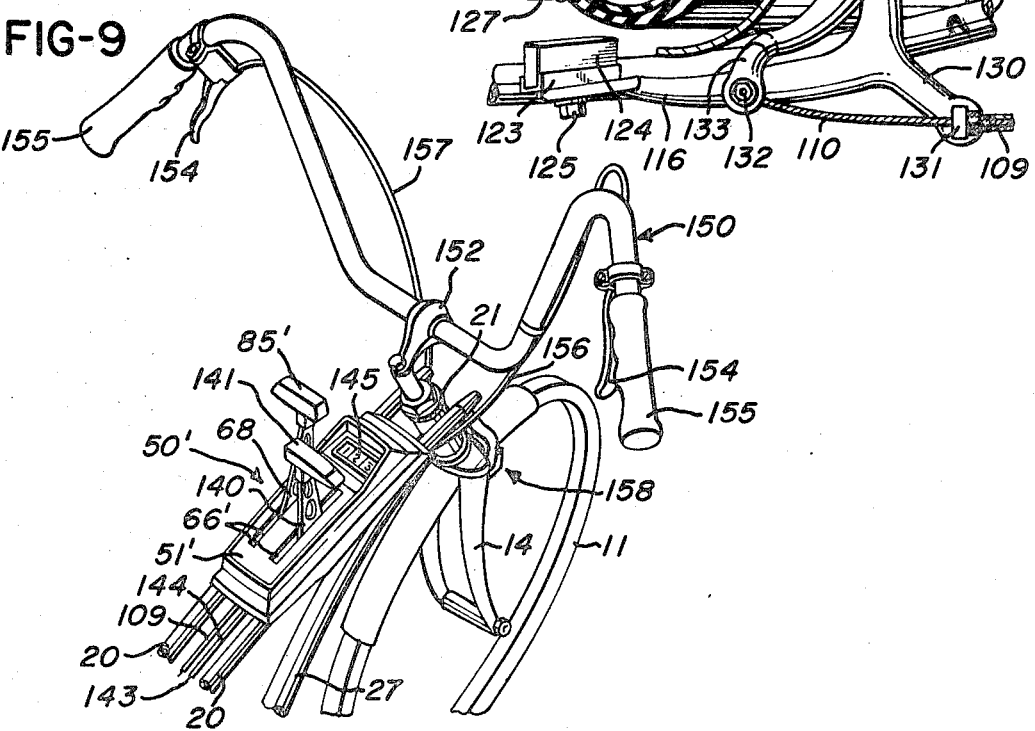

United States Patent Office 3,567,250
Patented Mar. 2, 1971

3,567,250
BICYCLE WITH IMPROVED BRAKE SYSTEM
Donald A. Wolf, Dayton, Ohio, assignor to The Huffman Manufacturing Company, Dayton, Ohio
Filed Mar. 12, 1969, Ser. No. 806,470
Int. Cl. B62j 27/00
U.S. Cl. 280—289     6 Claims

ABSTRACT OF THE DISCLOSURE

A bicycle has a brake actuator including a housing mounted on twin upper tubes of the frame below an automotive type steering wheel or a handlebar. A pivotable lever is supported by the housing between the tubes and is connected by a shielded cable to caliper brakes for the rear wheel of the bicycle. The lever is effective to lock the rear wheel against rotation for providing a parking brake. The housing may also support a second pivotable lever connected to actuate a speed change mechanism.

BACKGROUND OF THE INVENTION

In a standard bicycle, the conventional handlebar is suitably deformed so that the handle grips are properly located to receive the hands of the rider for steering the bicycle. Commonly, brake actuator handles are pivotally mounted on the handlebar adjacent the handle grips so that the rider can conveniently place each hand simultaneously on both a handle grip and the adjacent brake handle.

When an automotive-type wheel is used on a bicycle instead of a handlebar, the conventional brake actuator handles are unsuitable because the handles cannot be conveniently actuated, and the operating wires or cables extending from the actuator handles interfere with full rotation of the steering wheel. Furthermore, when the pressure on each actuating handle is released, the corresponding brake is released. This is necessary since the gripping manner in which a rider's hand grasps both the handle grip and the brake actuating handle does not permit the brake operating mechanism to be manually moved to its released position. Thus this type of braking mechanism cannot function to lock the brakes in their braking positions and thereby provide a parking brake.

SUMMARY OF THE INVENTION

The present invention is directed to a bicycle which includes an improved wheel brake system. In accordance with one embodiment of the invention, a bicycle has an automotive-type steering wheel which enables the operator to turn the front wheel through 360°. A brake actuator includes a housing which is mounted on twin upper tubes of the bicycle frame below the rear portion of the steering wheel, and the housing supports a pivotable lever connected by a cable to caliper brakes for the rear wheel. The actuating lever must be positively moved manually between its alternate braking and release positions. In accordance with another embodiment, the brake actuator housing also supports a second pivotable lever which may be connected to a speed change mechanism.

BRIEF DESCRIPTION OF THE DRAWINGS

FIG. 7 is a section taken generally on the line 7—7 of FIG. 4 and also illustrating a caliper brake mechanism for the rear wheel;

FIG. 8 is a section taken generally on the line 8—8 of FIG. 7; and

FIG. 9 is a fragmentary perspective view showing a modification of a bicycle constructed in accordance with the invention.

DESCRIPTION OF THE PREFERRED EMBODIMENTS

Figure 1:
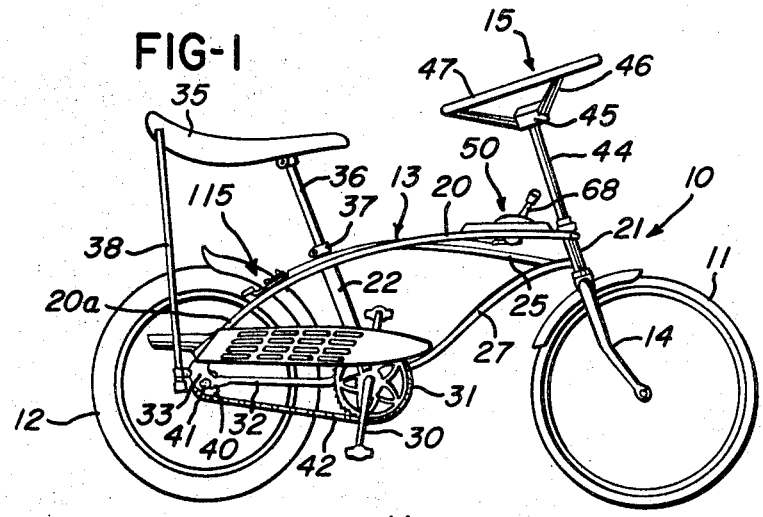
FIG. 1 is a side elevational view of the bicycle constructed in accordance with the invention.
Figure 2:
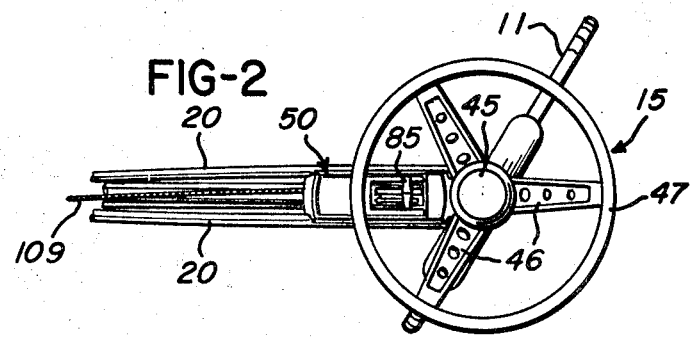
FIG. 2 is a plan view of the front portion of the bicycle shown in FIG. 1.

Referring to FIG. 1, the bicycle 10 includes front and rear wheels 11 and 12 which support a frame 13 in the usual manner. The front fork 14 supports the front wheel 11 for turning movement which is supplied by a round automotive-type steering wheel 15 disposed above the front wheel 11 for rotating the fork 14 through 360°. The frame 13 includes a pair of generally parallel upper tubes 20 which extend rearwardly from a welded tangential connection with the front fork mast 21 to a similar connection with the generally vertically disposed seat mast 22.

An upper truss tube 25 is secured near the forward end of a lower tube 27 and extends rearwardly between the parallel tubes 20 and is welded to the upper portion of the seat mast 22. The rear end portion of the lower tube 27 is secured to a tubular sprocket housing (not shown) which supports a crank 30 and a large crank sprocket 31 in the usual manner. A pair of horizontal tubes 32 extend from rigid connections with the sprocket housing to engagement with corresponding rear axle plates 33 which are also welded to rear sections 20a of the tubes 20 to complete the rear fork which supports the rear wheel 12.

An elongated "banana" type seat 35 has its forward end supported by a seat post 36 which is received within the seat mast 22 and is clamped in position by the collar 37. The rear portion of the seat 35 is supported by parallel braces 38 which extend downwardly and are secured to the ends of the rear fork members 20a. A conventional rear hub assembly includes a drive sprocket 40 mounted on the rear axle 41 and driven by a chain 42 extending from the crank sprocket 31.

The automotive-type steering wheel 15 includes a hub portion 45 which is mounted on the upper end of an elongated stem 44 connected to the fork 14 within the mast 21. Three spoke members 46 extend outwardly and upwardly from the hub portion 45 and support a circular rim or hand portion 47. The steering wheel 15 is preferably made of plastic material having metal components which internally support and reinforce the plastic material.

In accordance with the invention, a brake console or actuator 50 includes a housing 51 and a brake actuator assembly 52 for operating the brakes. The housing 51, as shown in FIGS. 3–8, may be constructed of a rigid plastic material and includes a relatively flat top wall 53 (FIG. 6) connecting downwardly extending side walls 54 formed integrally therewith. Front and rear end walls 56 and 57, respectively, taper downwardly (FIG. 3) from integral connections to the top and side walls 53 and 54.

Circular cutouts 61 and 62 are provided at the lower corners of each of the end walls 56 and 57, respectively, and have a diameter substantially equal to the outer diameter of the parallel tubes 20. The centers of these cutouts are spaced apart a distance equal to the distance between the centerlines of the parallel tubes 20 so that the tubes 20 receive the housing 51 in the manner shown in FIG. 4 wherein the lower edges 64 of the side walls 54 engage the top surface of the tubes 20 and the edges of the cutouts 61 and 62 intimately seat on the tubes.

A rounded or curved projection 65 is formed centrally within the top wall 53 and has a slot 66 therein. A brake member or lever 68 extends upwardly through the slot 66 and indicia in the form of an arrow 69, is provided on the top surface of the projection to indicate the condition of the brake lever 68, as will be described.

Figure 6:
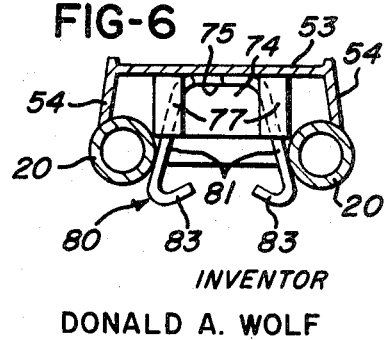
FIG. 6 is a section taken generally on the line 6—6 of FIG. 3.

Positioned within the housing 51 are front and rear connectors 71 and 72 (FIG. 3) which secure the housing securely in position on the tubes 20. Each of the connectors 71 and 72 include a downwardly extending transverse partition 74 which is integrally formed with the top and side walls 53 and 54 (FIG. 6). A horizontal slot 75 (FIG. 6) is formed within the upper central portion of each partition adjacent the top wall 53, and a pair of inwardly extending flanges 77 are spaced from each partition 74 to define a pair of opposing grooves.

The connectors 71 and 72 each include an inverted generally U-shaped wire 80 having leg portions 81 with their lower ends 83 curved inwardly, and a horizontal extending upper loop 84 (FIG. 3) is formed within the upper central portion of each wire. To install each wire 80, the leg portions 81 are pinched or forced together and the upper loop 84 is inserted into the slot 75 within the corresponding partition 74. The leg portions 81 are then released so that they expand into the grooves defined between the partition 74 and the flanges 77. When the actuator 50 is placed on the parallel upper tubes 20, the leg portions 81 are forced or cammed together and then move outwardly where the ends 83 provide pressure engagement against the tubes 20 to hold the housing 51 firmly in position.

Figure 4:
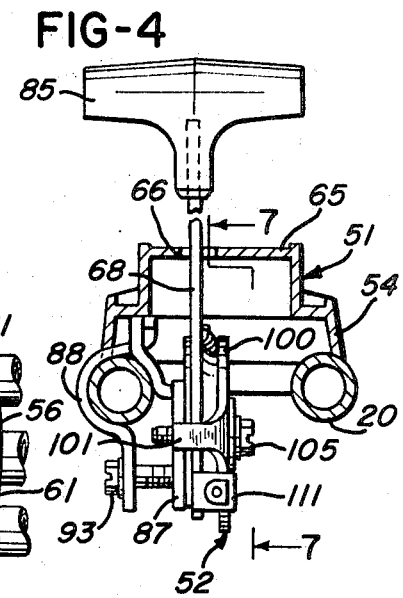
FIG. 4 is a section taken generally on the line 4—4 of FIG. 3.
Figure 3:
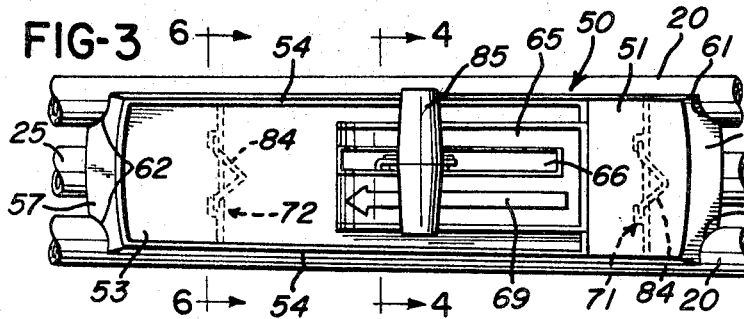
FIG. 3 is a fragmentary plan view of the brake actuator.
Figure 5:
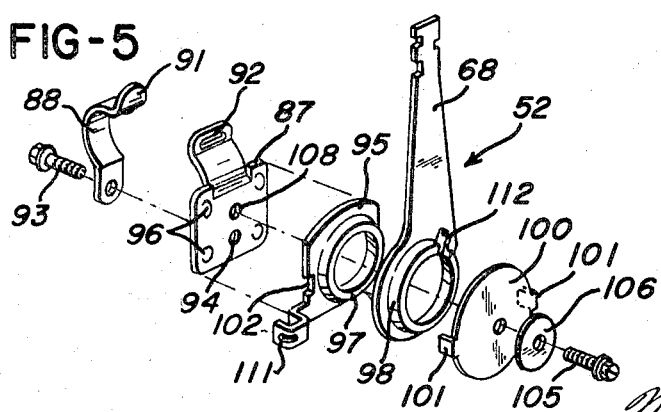
FIG. 5 is a fragmentary exploded perspective view of the brake actuator assembly.

The brake actuating assembly 52 is shown in FIGS. 4 and 5 and includes a brake actuating lever 68 having a T-shaped handle 85 secured to the top end thereof. The assembly also includes a mounting bracket 87 which is clamped to the left tube 20 by a bracket 88 having a tongue 91 which extends through a slot 92 formed within the bracket 87. The lower end of the bracket 88 is secured by a screw 93 which is threadedly received within an opening 94 formed within the bracket 87.

A pivot plate 95 is welded to the bracket 87 by the weld projections 96 and has an annular bearing shoulder 97 which rotatably supports an annular shoulder 98 formed on the lower end of the lever 68. A plate 100 retains the lever 68 on the shoulder 98 and has a pair of ears 101 which are received within complementary slots 102 formed within the pivot plate 95. A screw 105 extends through a concave spring washer 106 and is threaded into an opening 108 within the bracket 87 as shown in FIG. 5 for retaining the lever 68 in friction engagement between the plates 95 and 100. Thus by either pushing or pulling the handle 85 in a forward or rearward direction, the lever 68 rotates on the axis of the shoulder 97.

Referring to FIG. 7, a sheath 109 encloses a movable control cable or wire 110 which is connected to the brake lever 68 at 112 so that the wire 110 is shifted within the sheath 109 when the lever 68 is pivoted. The brake actuator assembly 52 is covered by the housing 51 so that there is little danger of contact between the rider and the control wire 110 and the assembly 52. As mentioned above, the position of the lever 68 is indicated by arrow 69 on the projection 65 of the housing 51 so that the operator knows whether the brakes are engaged or disengaged.

Referring to FIGS. 7 and 8, caliper brakes 115 are utilized in this invention and generally include L-shaped pivot arms 116 and 117 which are connected by a pivot pin 118 to a frame cross member 120 extending between the rear tube section 20a. A brake shoe assembly 123 is mounted on one end of each of the arms 116 and 117 and includes a block of friction material 124 which is secured in place by a conventional fastener 125. The arms are so designed that the brake shoes move into contact with the side walls 127 of a metal rim 128 of the rear wheel 12 thereby applying friction to the rim to reduce and stop its movement.

The arms 116 and 117 are pivoted by the control wire 110 having its sheath 109 secured to an extension 130 of the arm 116 by a suitable connector 131 (FIG. 8). The wire 110 extends through the connector 131 and is connected at 132 to the end 133 of the other arm 117. When the wire 110 is drawn into the sheath 109 by rearward movement of the actuator lever 68, the brake shoes 123 are urged toward each other into contact with the rim 128 to create the braking action.

In operation of the invention, a person sitting on the seat 35 can easily steer the bicycle through the use of the automotive-type steering wheel 15. Since the steering wheel 15 is round, the rider can readily control the steering operation, as for example, can easily steer with one hand and can turn the wheel through 360° for trick riding and the like. The braking operation is established by the rider reaching underneath the steering wheel 15 and moving the handle 85 of the actuating lever 68 rearwardly. Forward movement of the actuating lever 68 releases the brakes. Because there is no spring biased return on the actuating lever 68, it can be moved rearwardly to its braking position where it is positively held by the frictional force exerted by the spring washer 106. In this manner, the rear brakes on the bicycle 10 remain engaged so that the bicycle will not coast down a slight grade or cannot be easily pushed without first releasing the brakes by moving the lever 68 forwardly toward the front fork mast 21.

Referring to FIG. 9 which shows the front portion of a bicycle constructed in accordance with another embodiment of the invention, a brake console or actuator 50' includes a housing 51' which is secured to the parallel tubes 20. Instead of a single slot within the console 51', a pair of slots 66' are provided. A pivotable brake actuating lever 68' projects upwardly through the left slot 66' and receives a handle 85', and a second pivotable lever 140 projects upwardly through the right slot 66' and receives a handle 141. The brake actuating lever 68' operates in the same manner as the brake actuating lever 68 described above, that is, to brake the bicycle and form a parking brake when the handle 85' is pulled rearwardly and to release the brake when the handle is moved forwardly.

The lever 140 is connected to move a second wire or cable 143 within a sheath 144 connected to a conventional speed change mechanism such as a chain derailer or a three-speed hub for the rear wheel. That is, by pivoting the lever 140, the speed change mechanism is shifted between selective speed ratios and simultaneously moves a pointer adjacent a numbered face 145 for indicating the selected speed ratios.

In place of the steering wheel 15 and supporting stem 44, the front wheel 11 is steered by a handle bar 150 which is secured to the front fork 14 by a conventional clamping arm 52. A brake actuating handle 154 is pivotally supported adjacent the right handle grip 155 and is connected by a sheath wire 156 to the brake actuating lever 68' so that the caliper brakes for the rear wheel may be actuated by pivoting either the lever 68' or the lever 154. Another actuating lever 154 is pivotally supported adjacent the left handle grip 155 and is connected by a sheath wire 157 to a caliper brake 158 mounted on the front fork 14 adjacent the rim of the front wheel 11.

From the drawings and the above description, it is apparent that a bicycle constructed in accordance with the present invention provides desirable features and advantages. For example, the mounting of the brake actuator 50 on the twin upper tubes 20 adjacent the front fork mast 21 provides for conveniently operating the brakes for the rear wheel. This location and arrangement is especially desirable when the automotive-type steering wheel 15 is used for steering the front wheel. Furthermore, the frictional engagement of the brake actuating lever 68 between the plates 95 and 100 produced by the spring washer 106, assures that the caliper brakes for the rear wheel will remain in either a braking condition or a released condition. Thus when the actuating lever 68 is pulled rearwardly by the rider to brake the bicycle, the rear caliper brake will remain in a braked condition and serve as a parking brake until the actuating lever 68 is manually pivoted toward the front mast 21.

The modification shown in FIG. 9 also provides a desirable feature. That is, the brake actuating lever 68' is combined with a speed change shift lever 140 to provide a convenient location for both of these controls for the bicycle. It is to be understood that it is within the scope of the invention to connect the second pivotable lever 140 by a sheath wire to caliper brakes for the front wheel so that the brakes for both the front and rear wheels may be conveniently actuated by moving the levers 68' and 140. This arrangement might be desirable on a bicycle having an automotive-type steering wheel such as shown in FIG. 1.

The invention thus provides a novel bicycle having a steering wheel which allows increased maneuverability in combination with an actuator for caliper brakes mounted on the rear fork of the bicycle frame for engaging the rear wheel. The brakes can be locked in its engaged position to prevent the bicycle from moving without first releasing the brakes, and because the distance between the brake actuator 50 or 50' and the brake 115 does not change or vary, less adjustment is required to compensate for changes of length of the sheath or wire.

While the forms of apparatus herein described constitute preferred embodiments of the invention, it is to be understood that the invention is not limited to these precise forms of apparatus, and that changes may be made therein without departing from the scope and spirit of the invention.

What is claimed is:

1. A cycle comprising a frame including a seat mast and a front fork mast, a pair of upper tubes connecting said front fork mast to the upper portion of said seat mast, a front fork rotatably supported by said fork mast, a front wheel mounted on said front fork, steering means mounted on said front fork for turning said front wheel, a rear wheel mounted on said frame, crank means mounted on said frame, drive means connecting said crank means to said rear wheel for propelling the cycle and including a speed change mechanism, a brake actuator supported by at least one of said tubes between said seat and front fork masts and including a first pivotable brake actuating lever projecting upwardly from said tubes, a second pivotable lever projecting upwardly from said tubes in laterally spaced relation to said first lever and connected to operate said speed change mechanism, an elongated housing mounted on said tubes covering at least a portion of said brake actuator, slot means within said housing for receiving said first and second levers, a caliper brake mounted on said frame and disposed to effect braking of said rear wheel, and means connecting said brake actuating lever to said brake for operating said brake in response to movement of said brake actuating lever.

2. A cycle comprising a frame including a seat mast and a front fork mast, a pair of upper tubes connecting said front fork mast to the upper portion of said seat mast, a front fork rotatably supported by said fork mast, a front wheel mounted on said front fork, steering means mounted on said front fork for turning said front wheel, a rear wheel mounted on said frame, crank means mounted on said frame, drive means connecting said crank means to said rear wheel for propelling the cycle, a brake actuator mounted on at least one of said tubes between said seat mast and said front fork mast and including a pivotable brake actuating lever projecting upwardly from said tubes, a handle member mounted on the upper end of said lever, a housing mounted on said tubes covering a portion of said brake actuating lever and having a slot through which said lever projects upwardly, a caliper brake mounted on said frame and disposed to effect braking of said rear wheel, means connecting said brake actuating lever to said brake for operating said brake in response to movement of said actuating lever, and said connecting means being effective to energize said brake for gripping said rear wheel in response to manual movement of said handle member rearwardly toward said seat mast and to release said brake in response to movement of said handle toward said fork mast.

3. A cycle as defined in claim 2 including means for holding said actuating lever and said brake means in a braking condition to provide a parking brake.

4. A cycle as defined in claim 2 including means on said housing for indicating the energized and released conditions of said brake.

5. A cycle as defined in claim 2 including a second pivotable lever projecting upwardly from said housing and adapted to operate a speed change mechanism driven by said crank means.

6. A cycle comprising a frame including a seat mast and a front fork mast, a pair of upper tubes connecting said front fork mast to the upper portion of said seat mast, a front fork rotatably supported by said fork mast, a front wheel mounted on said front fork, steering means mounted on said front fork for turning said front wheel, a rear wheel mounted on said frame, crank means mounted on said frame, drive means connecting said crank means to said rear wheel for propelling the cycle, a brake actuator mounted on at least one of said tubes between said seat mast and said front fork mast and including a pivotable brake actuating lever projecting upwardly from said tubes, a handle member mounted on the upper end of said lever, a housing mounted on said tubes covering a portion of said brake actuating lever and having a slot through which said lever projects upwardly, a caliper brake mounted on said frame and disposed to effect braking of said rear wheel, means connecting said brake actuating lever to said brake for operating said brake in response to manual movement of said actuating handle member, and means for holding said brake actuating lever and said brake in an energized condition gripping said rear wheel to provide a parking brake.

References Cited

UNITED STATES PATENTS

| | | | |
|---|---|---|---|
| 597,031 | 1/1898 | Stanley | 188—24 |
| 2,171,886 | 9/1939 | Musselman | 74—501 |
| 2,773,398 | 12/1956 | Swain | 74—501 |
| 3,336,817 | 8/1967 | Madden, Jr. | 280—263 |
| 3,406,587 | 10/1968 | Brilando et al. | 74—501 |
| D. 213,747 | 4/1969 | Ross | D90—1 |
| D. 209,944 | 1/1968 | Schreckengost | D90—1 |

KENNETH H. BETTS, Primary Examiner

R. R. SONG, Assistant Examiner

U.S. Cl. X.R.

74—501; 188—24